United States Patent [19]

Harder, Jr.

[11] 4,275,925
[45] Jun. 30, 1981

[54] BACK SHROUD FOR SEAT

[75] Inventor: Arthur J. Harder, Jr., Franklin Park, Ill.

[73] Assignee: Coach and Car Equipment Corporation, Elk Grove Village, Ill.

[21] Appl. No.: 56,327

[22] Filed: Jul. 10, 1979

[51] Int. Cl.³ .............................................. A47C 7/42
[52] U.S. Cl. .................................. 297/444; 297/445; 297/452
[58] Field of Search ............... 297/452, 445, 443, 444, 297/DIG. 2, 218, 232

[56] References Cited

U.S. PATENT DOCUMENTS

| 2,121,130 | 6/1938 | McGowen | 297/DIG. 1 |
| 2,159,098 | 5/1939 | Morgan | 297/445 X |
| 2,550,479 | 4/1951 | Hoven | |
| 2,719,579 | 10/1955 | Schaffer | 297/443 |
| 3,471,200 | 10/1969 | Morrison | 297/441 |
| 3,619,006 | 11/1971 | Barecki | 297/232 |
| 3,642,322 | 2/1972 | Bilancia | 297/442 |
| 3,734,561 | 5/1973 | Barecki | 297/DIG. 2 |
| 3,747,978 | 7/1973 | Barecki | 297/445 |
| 3,797,887 | 3/1974 | Barecki | 297/445 X |
| 4,059,306 | 11/1977 | Harder, Jr. | 297/442 |

FOREIGN PATENT DOCUMENTS

| 510466 | 8/1939 | United Kingdom | 297/445 |
| 1330324 | 9/1973 | United Kingdom | 297/452 |

Primary Examiner—Francis K. Zugel
Attorney, Agent, or Firm—Merriam, Marshall & Bicknell

[57] ABSTRACT

A seat for a mass transit vehicle has a metal frame with a back portion including side bars and a top bar. A back shroud for the seat is slidably mounted on the side bars. Hook-shaped marginal portions on the shroud engage the bars and hold the shroud against movement in upward, sideward, frontward and rearward directions. Movement of the shroud in a downward direction is prevented by a pair of fasteners, located in recesses in a downwardly depending portion of the shroud, and engaging a lower bar of the seat frame.

14 Claims, 8 Drawing Figures

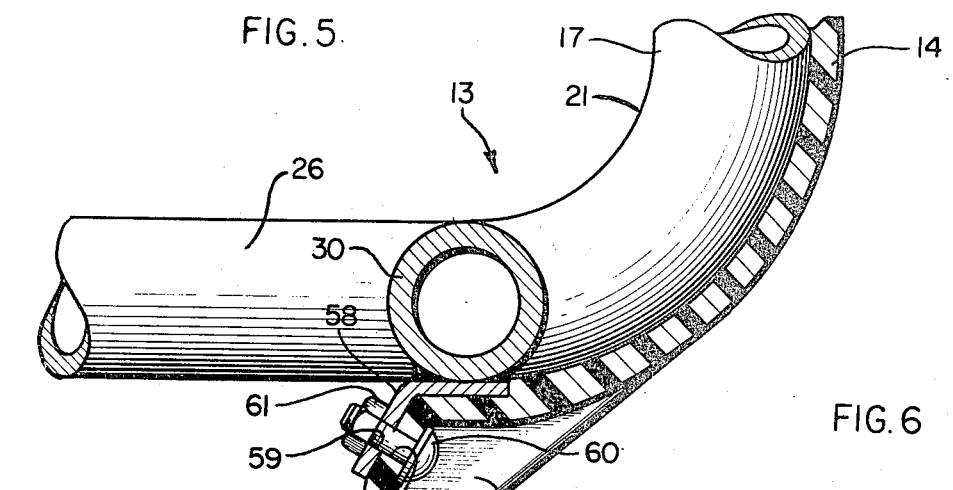
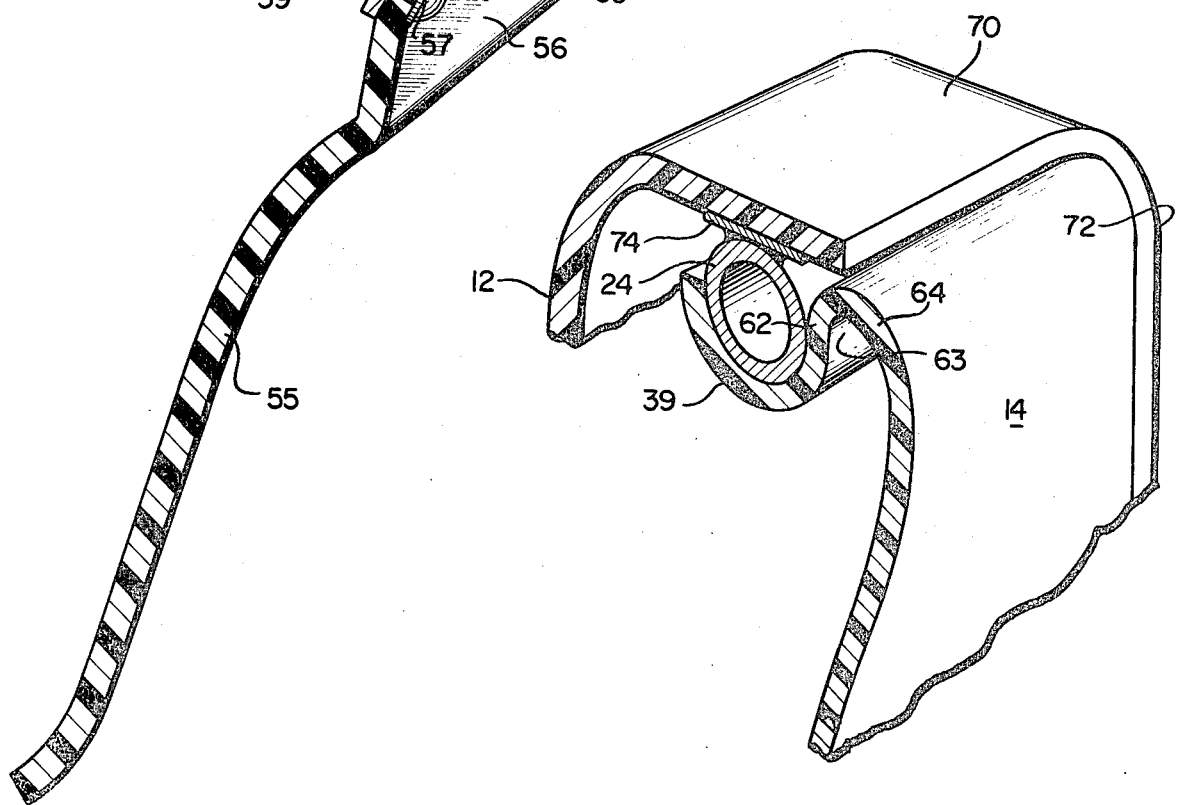
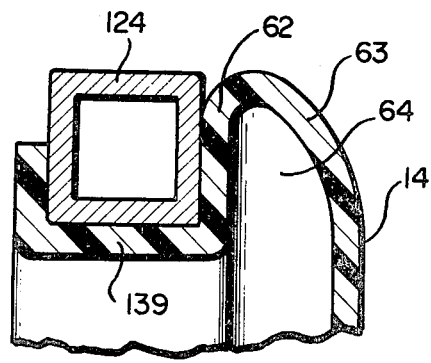
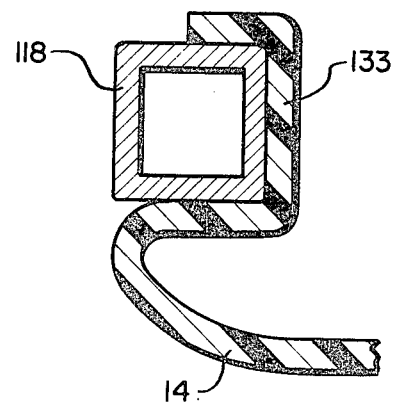

BACK SHROUD FOR SEAT

BACKGROUND OF THE INVENTION

The present invention relates generally to seats and more particularly to the back shroud for a vehicle seat used on public transportation vehicles such as busses or rapid transit cars.

Conventionally, such seats are mounted on a metal seat frame having a back portion, and, for esthetic purposes, the exposed parts of the frame's back portion are covered by an exterior, decorative, plastic back shroud. The back portion of the seat frame typically comprises a pair of vertically disposed side bars and a top bar extending between the upper ends of the two side bars.

Certain problems arise in conventional seat constructions utilizing metal seat frames and exterior, plastic back shrouds. For example, the back shrouds are typically assembled to the back portion of the seat frame with metal fasteners which can be removed by vandals causing the assembly to come apart and rendering the plastic back shroud very susceptible to pilferage. In addition, the back shroud can be damaged by vandals, and this requires periodic replacement of the shroud.

Removal of a damaged shroud and/or installation of a replacement shroud is relatively lengthy and tedious, when the shroud is attached to the frame with numerous fasteners.

SUMMARY OF THE INVENTION

A seat having a back shroud constructed in accordance with the present invention eliminates the problems described above. Most of the fasteners are eliminated entirely, and those few fasteners which are used are not readily visible or accessible, thus hindering the removal of these few fasteners by vandals.

Installation or removal of the back shroud is rapid and accomplished with ease. More specifically, the back shroud may be installed merely by sliding it upwardly onto the back portion of the seat frame, from below, and the back shroud may be removed merely by sliding it downwardly off of the back portion of the frame.

Once the back shroud has been slid into place on the back portion of the seat frame, it is held against upward, sideward, frontward and rearward movement by hook-shaped marginal portions on the top and sides of the back shroud, which engage the side bars and top bar of the back portion of the seat frame.

The back shroud is held against downward movement on the frame's back portion by a pair of fasteners each located in a respective recess on a lower depending portion of the back shroud. This depending portion extends frontwardly under the seat frame so that the fasteners located in the recesses are not readily visible to a potential vandal unless the vandal gets down on his hands and knees on the floor of the vehicle and looks under the seat.

In addition, structure is provided, adjacent the top marginal portion of the back shroud to cushion the impact of a blow directed toward the top or upper bar on the back portion of the seat frame. The impact-cushioning structure prevents injury to the head of an occupant of a seat located behind the back shroud because, during sudden stops or lurches by the vehicle, the head of such an occupant could strike the area protected by the impact-cushioning structure.

Other features and advantages are inherent in the structure claimed or disclosed or will become apparent to those skilled in the art from the following detailed description in conjunction with the accompanying diagrammatic drawings.

BRIEF DESCRIPTION OF THE DRAWINGS

FIG. 5 is an enlarged, fragmentary, vertical sectional view of the bottom portion of the seat;

FIG. 6 is an enlarged, fragmentary perspective, partially in section, of the portion of the seat shown in FIG. 3;

FIG. 7 is an enlarged, fragmentary, vertical sectional view, similar to FIG. 3, but illustrating another embodiment of a seat constructed in accordance with the present invention; and FIG. 8 is an enlarged, fragmentary, horizontal sectional view, similar to FIG. 4, but illustrating the embodiment of FIG. 7.

DETAILED DESCRIPTION

Figure 1:
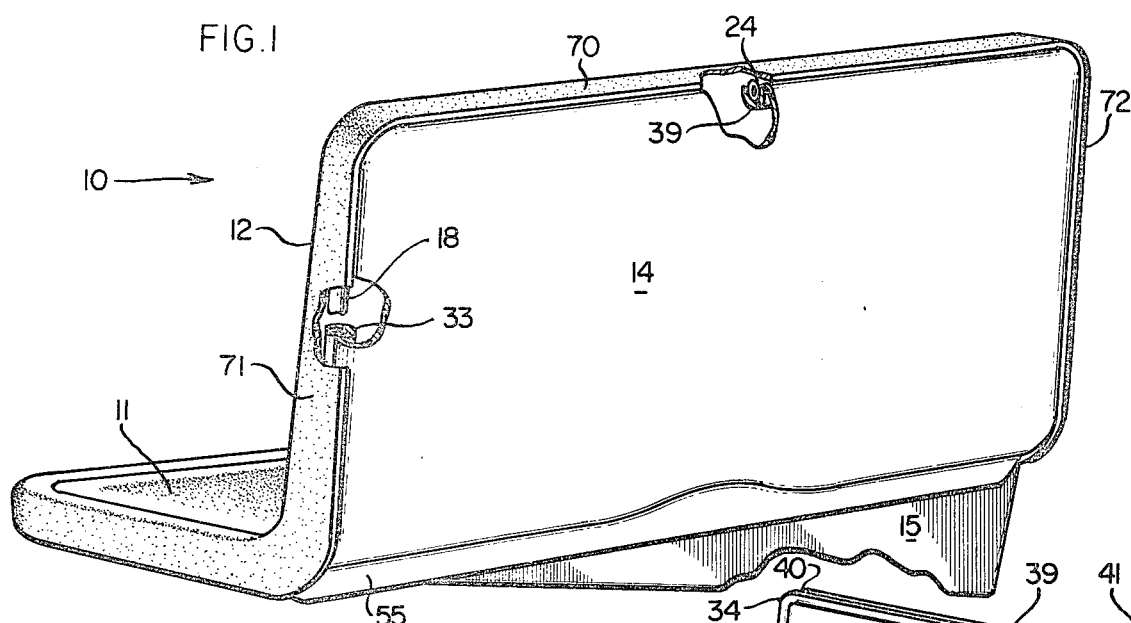
FIG. 1 is a perspective of a seat having a back shroud constructed in accordance with an embodiment of the present invention.
Figure 2:
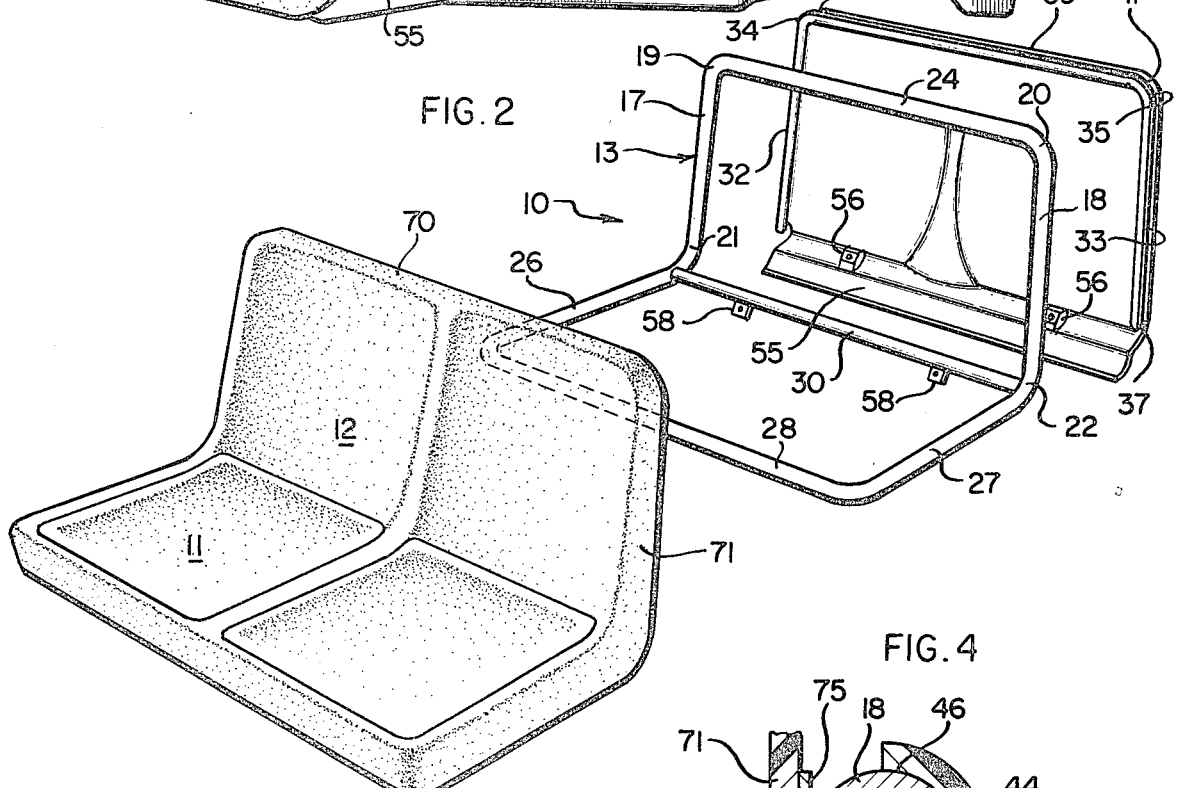
FIG. 2 is an exploded perspective of the seat of FIG. 1.

Referring initially to FIGS. 1 and 2, indicated generally at 10 is a two-passenger mass-transit vehicle seat comprising an occupant accommodating portion 11 integral with a seat back 12 and mounted on a seat frame indicated generally at 13. A back shroud 14 is also mounted on frame 13 which is, in turn, mounted atop a cantilevered support indicated at 15 in FIG. 1.

Seat frame 13 has a back portion including a pair of vertically disposed side bars 17, 18 each having upper end parts 19, 20, respectively, and lower end parts 21, 22, respectively. A horizontally disposed upper bar 24 extends between and is integral with upper end parts 19, 20. Extending frontwardly from side bars 17, 18 at their respective lower end parts 21, 22 are a pair of horizontally extending bars 26, 27, and extending between the front ends of bars 26, 27 is a front bar 28. Horizontally extending bars 26, 27 are integral extensions of vertically disposed side bars 17, 18, and front bar 28 is integral with horizontal extending bars 26, 27. Seat frame 13 also comprises a horizontally disposed lower bar 30 extending between, and indented frontwardly in relation to, lower end parts 21, 22 of side bars 17, 18, respectively.

Back shroud 14 comprises a pair of side marginal portions 32, 33 each having a respective upper end 34, 35 and a respective lower end 36, 37. Extending between upper ends 34, 35 of the side marginal portions is a top marginal portion 39. Top marginal portion 39 joins with upper ends 34, 35 of the two side marginal portions to define two junctions 40, 41. In effect, top marginal portion 39 is a continuation of each of the two side marginal portions 32, 33.

Figure 3:
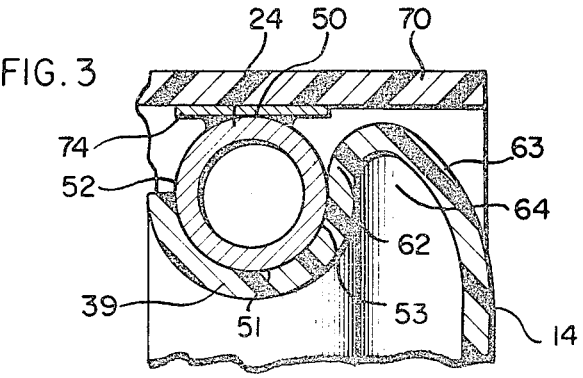
FIG. 3 is an enlarged, fragmentary, vertical sectional view of an upper part of the back portion of the seat.
Figure 4:
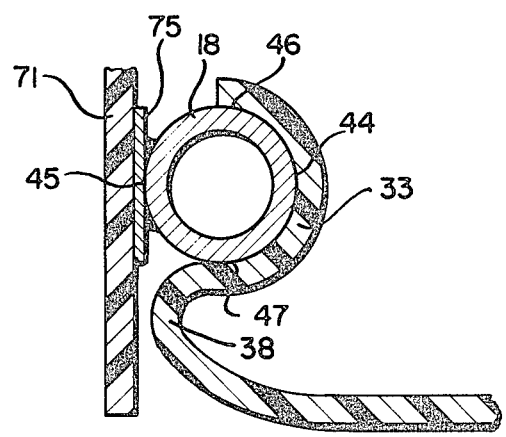
FIG. 4 is an enlarged, fragmentary, horizontal sectional view of a side part of the back portion of the seat.

Both of side marginal portions 32, 33 are hookshaped, with side marginal portion 33 (FIG. 4) being a mirror image of side marginal portion 32 as particularly illustrated in FIG. 4, each hook-shaped marginal portion has its bight 38 integral with and extending from back shroud 14. Side marginal portions 32, 33 mount back shroud 14 for vertical sliding movement on side bars 17, 18 of the seat frame's back portion. As shown in FIG. 3, top marginal portion 39 is hook-shaped and engages upper bar 24 of the seat frame's back portion from below to limit vertical sliding movement of the back shroud in an upward direction.

Back shroud 14 is installed on the back portion of the seat frame by sliding the shroud upwardly onto the seat frame from below. As previously noted, top marginal portion 39 is a continuation of side marginal portions 32, 33, and this permits the upper ends 34, 35 of side marginal portions 32, 33 to be slideably received on the lower end parts 21, 22 of side bars 17, 18 from below.

Referring to FIG. 4, each side bar 17 or 18 has inner and outer surface portions 44, 45 respectively and front and back surface portions 46, 47 respectively. The hook-shaped cross sectional configurations of side marginal portions 32, 33 permit the side marginal portions to engage the inner surface portions 44, 44 of the respective side bars 17, 18 and at least parts of the front and back surface portions 46, 47 of the side bars, to restrict back shroud 14 against movement in sideward, frontward and rearward directions.

Referring to FIG. 3, upper bar 24 has top and bottom surface portions 50, 51, respectively, and front and back surface portions 52, 53, respectively. The hook-shaped configuration of top marginal portion 39 permits the top marginal portion to engage the bottom surface portion 51 of upper bar 24 and at least parts of the front and back surface portions 52, 53 of upper bar 24, to restrict back shroud 14 against movement in upward, frontward and rearward directions.

Thus, in summary, the side marginal portions 32, 33 and the top marginal portion 39 co-operate to engage side bars 17, 18 and upper bar 24, respectively, to hold the back shroud 14 against movement in forward and rearward directions. Side marginal portions 32, 33 engage side bars 17, 18, respectively, to hold back shroud 14 against movement in sideward directions, and top marginal portion 39 engages upper bar 24 to hold the back shroud against movement in an upward direction.

Movement of back shroud 14 in a downward direction is prevented by a pair of fasteners engaging the back shroud to the seat frame, the details of which will now be described.

Referring to FIGS. 2 and 5, located at the bottom of back shroud 14 is a lower depending portion 55 extending frontwardly in relation to side marginal portions 32, 33 of the back shroud and comprising structure for covering from view lower bar 30. Located in depending portion 55 are a pair of recesses 56, 56 each having a hole 57. In the embodiment of FIG. 5, each recess 56 is located essentially directly below lower bar 30. Welded to lower bar 30 are a pair of downwardly depending tabs 58, 58 each having a hole 59 aligned with the respective hole 57 in a recess 56. Aligned holes 57, 59 receive the shank of a threaded fastener 60 having a head portion received in recess 56. A nut 61 engages threated fastener 60 at tab 58.

Fasteners 60 are associated with lower depending portion 55 on back shroud 14 and nuts 61 are associated with lower bar 30 on frame back portion 13. Engagement of fasteners 60 with nuts 61, in the manner illustrated in FIG. 5 attaches back shroud 14 to seat frame back portion 13 to hold the back shroud against downward sliding movement on side bars 17, 18.

Lower depending portion 55 extends frontwardly in relation to the side marginal portions and is located beneath the seat frame, and recess 56 is indented frontwardly in relation to the surrounding parts of depending portion 55. Therefore, by locating fastener 60 within recess 56, the fastener is at least partially obscured from view and can only be seen by someone who gets down on his hands and knees and looks underneath the back of the seat.

As previously noted, lower frame bar 30 is indented frontwardly in relation to lower end parts 21, 22 of side bars 17, 18. This permits the upper ends 34, 35 of the side marginal portions on the back shroud to be slideably received on the lower end parts 21, 22 of the side bars from below. If lower bar 30 were located further rearwardly, directly below lower end parts 21, 22, it might interfere with the reception of side marginal portions 32, 33 on the side bars' lower end parts 21, 22.

Referring to FIG. 3, upper marginal portion 39 has a hook-shaped configuration which includes an upwardly curved first shank portion 62 and a downwardly curved second shank portion 63 integral with first portion 62. Shank portions 62, 63 are separated by a space 64 located therebetween. Back shroud 14 is composed of a resilient material such as plastic or reinforced fiberglass, and the configuration indicated at 62, 63 and 64 in FIG. 3 comprises structure for cushioning the impact of a blow directed toward upper bar 24 from behind.

In the embodiment illustrated in FIGS. 7 and 8, the upper bar 124 and side bar 118 of the seat frame back portion have a rectangular or square cross section, rather than the round embodiment of FIGS. 3 and 4; and the top marginal portion 139 and side marginal portion 133 of the back shroud have hook-shaped configurations to fit the square or rectangular cross section of upper bar 124 and side bar 118.

When back shroud 14 has been installed and secured in place on seat frame back portion 13, occupant-accommodating portion 11 and its integral seat back 12 are installed in place in the manner illustrated in FIG. 1. As thus installed, a top flange 70 on seat back 12 overlaps and covers upper marginal portion 39 on back shroud 14, and side flanges 71, 72 on seat back 12 overlap and cover side marginal portions 32, 33 on back shroud 14.

Referring to FIG. 3, top flange 70 may be held in place by adhesively securing it to a plate 74 welded atop upper bar 24 of the seat frame back portion. Referring to FIG. 4, each of the side flanges 71, 72 may be adhesively secured to a plate such as 75 welded to a respective side bar (e.g. 18 in FIG. 4). The adhesive securement of side flanges 71, 72 to the respective side bars may be eliminated, in which case plate 75 may be eliminated.

The foregoing detailed description has been given for clearness of understanding only, and no unnecessary limitations should be understood therefrom, as modifications will be obvious to those skilled in the art.

I claim:

1. In combination, (a) a seat frame back portion including a pair of vertically disposed side bars each having upper and lower end parts and a horizontally disposed upper bar extending between said upper end parts of said side bars and (b) a back shroud slidably mounted on said seat frame back portion, said back shroud comprising:

a pair of hook-shaped side marginal portions each having a bight integral with and extending from said back shroud and each having an upper end;
an integral top marginal portion extending between the upper ends of said side marginal portions;

said hook-shaped side marginal portions comprising means for engaging said side bars on the exterior thereof and mounting said marginal portions and said back shroud for vertical sliding movement on said side bars of the seat frame back portion;

said top marginal portion joining with the upper end of each of said side marginal portions to define two junctions;

said top marginal portion being a continuation of said side marginal portions to permit the upper ends of said side marginal portions to be slidably received, with said back shroud, upon the lower end of said side bars from below;

fastening means for engaging said back shroud to said seat frame back portion to hold said back shroud against downward sliding movement on said side bars;

and a horizontally disposed lower bar extending between, and indented frontwardly in relation to, the lower end parts of said side bars;

said fastening means comprising a first fastening element;

said back shroud comprising recessed means, in substantial alignment with said lower bar, for receiving said first fastening element and for at least partially obscuring it from view;

said fastening means comprising a second fastening element associated with said lower bar for engagement with said first fastening element.

2. In the combination of claim 1 wherein:
said top marginal portion comprises hook-shaped means for engaging said horizontally disposed upper bar on the seat frame back portion for limiting vertical sliding movement of said rear panel in an upward direction.

3. In the combination of claim 2 wherein said mounting means on said side marginal portions comprise:
means for engaging said side bars to prevent movement of the back shroud in a sideward direction.

4. In the combination of claim 3 wherein said mounting means on the side marginal portions and said engaging means on the top marginal portion comprise:
means cooperating to engage said side bars and said upper bar, respectively, to hold the back shroud against movement in frontward and rearward directions.

5. In the combination of claim 2 wherein said mounting means on the side marginal portions and said engaging means on the top marginal portion comprise:
means cooperating to engage said side bars and said upper bar, respectively, to hold the back shroud against movement in a rearward direction.

6. In the combination of claim 2 wherein said mounting means on the side marginal portions and said engaging means on the top marginal portion comprise:
means cooperating to engage said side bars and said upper bar, respectively, to hold the back shroud against movement in a frontward direction.

7. In the combination of claim 1 wherein said top marginal portion comprises:
means, located behind said upper bar, for cushioning the impact of a blow directed toward said upper bar.

8. In the combination of claim 1 wherein:
said upper bar has top and bottom surface portions and front and back surface portions;
and said top marginal portion on the back shroud comprises hook means for engaging said bottom surface portion of the upper bar and at least parts of the front and back surface portions of the upper bar, to restrict said back shroud against movement in upward, frontward and rearward directions.

9. In the combination of claim 1 wherein:
each side bar has inner and outer surface portions and front and back surface portions;
and said side marginal portions on the back shroud each comprise hook means for engaging said inner surface portion of a respective side bar and at least parts of the front and back surface portions of said respective side bar, to restrict said back shroud against movement in sideward, frontward and rearward directions.

10. In the combination of claim 9 wherein:
said upper bar has top and bottom surface portions and front and back surface portions;
and said top marginal portion on the back shroud comprises hook means for engaging said bottom surface portion of the upper bar and at least parts of the front and back surface portions of the upper bar, to restrict said back shroud against movement in upward, frontward and rearward directions.

11. In the combination of claim 1 wherein:
said horizontally disposed lower bar is indented frontwardly enough to permit said side marginal portions of the back shroud to be slidably received on the lower end parts of said side bars from below.

12. In the combination of claim 1 wherein said back shroud comprises;
a lower depending portion extending frontwardly in relation to said side marginal portions and comprising means for covering said lower bar.

13. In the combination of claim 12 wherein:
said recessed means is located at said depending portion.

14. In the combination of claim 1 wherein:
said horizontally disposed lower bar is indented frontwardly enough to permit said side marginal portions of the back shroud to be slidably received on the lower end parts of said side bars from below;
said back shroud comprises a lower depending portion extending frontwardly in relation to said side marginal portions and comprising means for covering said lower bar;
and each of said side marginal portions has a lower end terminating above said depending portion.

* * * * *